United States Patent [19]
Kirkpatrick

[11] 3,810,173
[45] May 7, 1974

[54] PPI DISPLAY SYSTEM WITH DEFLECTION MODULATION TO REDUCE SPOKING

[75] Inventor: George M. Kirkpatrick, North Syracuse, N.Y.

[73] Assignee: Syracuse University Research Corporation, Syracuse, N.Y.

[22] Filed: Nov. 30, 1972

[21] Appl. No.: 310,682

[52] U.S. Cl. .................................. 343/5 R, 315/25
[51] Int. Cl. ............................................. G01s 7/12
[58] Field of Search ...................... 343/5 R; 315/25

[56] References Cited
UNITED STATES PATENTS

| | | | |
|---|---|---|---|
| 3,484,647 | 12/1969 | McGuinness | 315/25 X |
| 3,517,119 | 6/1970 | Klensch | 315/25 X |
| 2,905,855 | 9/1959 | Atti | 315/25 X |

Primary Examiner—T. H. Tubbesing
Attorney, Agent, or Firm—Paul & Paul

[57] ABSTRACT

A PPI display system representing slant range and azimuth angle corresponding to a given number of beam positions, having a noise source modulation circuit for modulating the scanning signal to cause random lateral deflection, and a long persistence display tube for providing video integration of such random deflections to reduce display spoking and provide a uniform PPI appearance.

13 Claims, 6 Drawing Figures

PPI DISPLAY SYSTEM WITH DEFLECTION MODULATION TO REDUCE SPOKING

BACKGROUND OF THE INVENTION

1. Field of the Invention

This invention lies in the field of PPI display systems and, more particularly, PPI display systems adapted for use with electronic scan antennas.

2. Description of the Prior Art

In many present day radar displays, such as used for monitoring weather in a given area, a sector PPI (plan position indicator) is used whereon the slant range and azimuth angle of targets are represented respectively by the distance from a fixed origin and by azimuth angle on the CRT face. For conventional electromechanically rotated, or scanned antennas, one of the oldest methods of producing the azimuth scan is by mechanical rotation of a single range-sweep deflection coil about the neck of the CRT. The deflection coil can be directly coupled to the antenna through a mechanical linkage or alternately by a more flexible electromechanical repeater. With this system, the sweep is made to take the direction on the CRT face which corresponds to the antenna orientation. Another prior art method utilizes a resolver mounted to the antenna and two orthogonal sweep coils on the PPI for generating the electronic sweep without mechanical parts other than the resolver on the antenna. In this case, the sweep components are formed by passing a range sawtooth through a two phase (sine-cosine) resolver with adequate frequency response to pass the frequency components of the range sawtooth. The resolver effectively multiplies the range sawtooth by sin $\theta$ and cos $\theta$ functions, where $\theta$ is the rotated angle of the antenna. The R sin $\theta$ and R cos $\theta$ functions are linearly amplified and caused to drive the orthogonal sweep coils.

The above methods are well known and satisfactory for use with antennas which are physically rotated. However, in many applications it is desirable to generate the sweep signals without the use of a resolver. In particular, with an electronic scan antenna of the type disclosed in U.S. Pat. No. 3,747,098, assigned to the same assignee as this application, the resolver must be replaced by electronic means for generating the angle information, as by sine-cosine function generators and multipliers. In such a situation, the information concerning the antenna beam position is coded into a series of discrete beam position numbers. As is explained hereinbelow, in such a system the sine of the azimuth angle is linearly related to the beam number counting from such central beam position. The antenna is stepped in equally spaced intervals, at the transmitter prf (pulse repetition frequency). The number of scans, or repititions of each beam position per second, is referred to as the PPI frame rate.

Operating experience with a radar system as disclosed in the above referenced application shows that if the frame rate is too low there is a resulting flicker which is clearly noticeable and annoying. However, given a maximum prf (prf is limited corresponding to a given radar range), the frame rate cannot be increased without markedly increasing the spoking appearance of the PPI display, since prf equals the product of frame rate times display spokes. Spoking, or the presence of substantial gaps between the scan lines, particularly near the top, or outer portion of the scan lines, detracts from the appearance of the display and makes the display difficult to interpret. There is thus a substantial need for a means of reducing display spoking without the need of modifying any other system parameters or sacrificing system performance at any other point.

By way of example, it is to be noted that in order to reach a range of 100 natuical miles, the pulse repetition frequency is limited to 833. With such a given prf, the radar system must compromise between flicker due to the number of frames per second and spoking, representing the number of rasters on the display, or scans per frame. If a scan rate of 26 is used, the display will have 32 spokes, and for a 90° sector, this results in appreciable spoking. Thus, spoking is inherent generally in PPI displays, whether the antenna is physically moved or electronically rotated. Of course, if the antenna beam is not moved continuously in azimuth, but in discrete steps (by using digital techniques and sweep circuits) then perhaps the spoking would be even more pronounced.

SUMMARY OF THE INVENTION

It is the primary object of this invention to provide a method, and means for carrying out such method, of reducing display spoking in a PPI display, particularly for an electronic scan antenna, which method is reliable and effective and carried out wihout compromising system performance in any way, and which means is inexpensive and compatible with existing display systems.

In accordance with the above objective, there is provided means for modulating the display scanning signal to cause lateral, or angular deflection of the scanning lines (spokes), so as to produce lateral displacement of each range/azimuth scan, in combination with a long persistence tube for integrating the visual effect produced by such modulation so that the spoking is reduced and the appearance of the PPI is made appreciably uniform. The modulation is accomplished preferably by adding to the output of the scan sweep generator the output of a noise generator. The range signal, derived from a range sawtooth generator triggered at the prf rate, and the scan signal are converted from polar to rectangular coordinates by a series of multiplication steps.

DESCRIPTION OF THE PREFERRED EMBODIMENT

Figure 1:
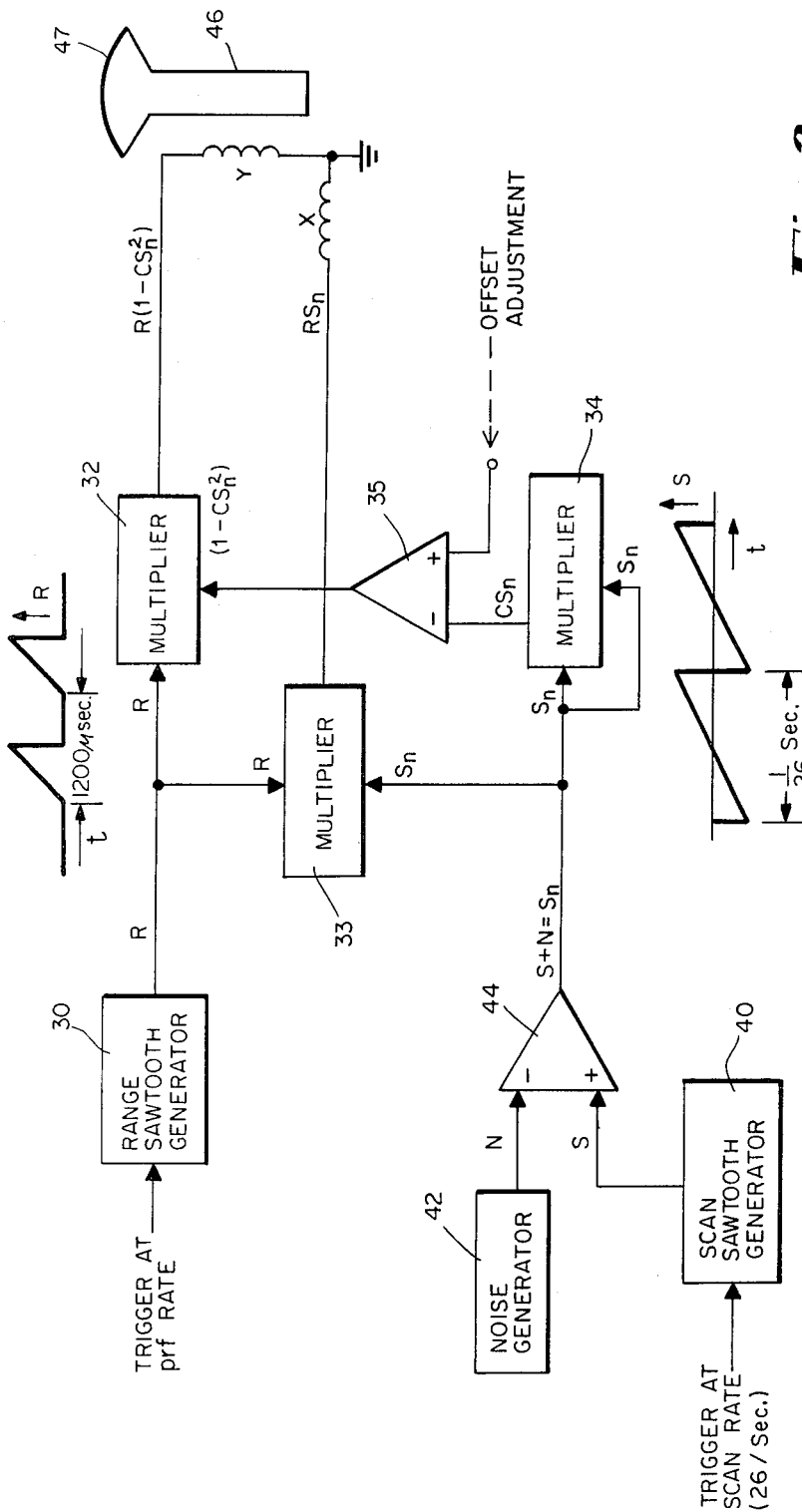
FIG. 1 is a block diagram illustrating circuitry embodying the apparatus of this invention and illustrating the method by which the scanning signals are modulated in order to reduce spoking.

The following description of the preferred embodiment will utilize, for illustrative purposes, the example of an electronic scan PPI, designed to be used in conjunction with an electronic scan antenna. However, it will be recognized that the method and apparatus of this invention is equally adaptable to conventional type antenna systems.

In an electronic scan antenna, the sine of the azimuth angle is linearly related to the beam number counting from the central beam position. The relationship between the azimuth beam angle and the digital phaser setting is shown from the relationship.

$$M \Delta \phi = kN \sin \theta, \tag{1}$$

where $M$ equals the beam position number, $\Delta \phi$ equals the least phase increment, $N$ equals the array element number, and $\theta$ equals the azimuth angle measured from the array normal. Since the antenna beam is stepped in equally spaced intervals, at the transmitter prf, the beam can be considered to move continuously. If the antenna beam is assumed to move continuously then the PPI sweeps may be designed to move continuously in azimuth rather than in discrete steps. It is to be noted that, if the beam is caused to step in increments, then scan sweep voltages which remain constant during a particular prf interval should be used. The assumption that the antenna beam moves continuously modifies the discrete position equation (1) to $$\phi = At = kN \sin \theta \tag{2}$$

where $\phi$ is a continuously variable phase assumed to be introduced to the Nth array element. From equation (2), the sine of the azimuth angle is a direct function of time, $$\sin \theta = At/kN; \quad \theta = \sin^{-1} [At/kN] \tag{3}$$

It is seen from the above that the azimuth angle does not scan linearly with time, but rather the angle varies as the inverse sine.

For a PPI display having orthogonal sweep coils, it is necessary to convert from polar to rectangular sweep components, as indicated by the following well known equations $$X = R \sin \theta \tag{4}$$

$$Y = R \cos \theta \tag{5}$$

where $R = Kt_1$, $t_1$ being time measured from initiation of the range sweep. Since $\sin \theta$ is directly available as a linear function of time, $$X = RBt_2 = RS \tag{6}$$

where $t_2$ is the time measured from the central beam position, $\theta = 0$.

Using the $Y$ sweep voltage from equation (5) and the trigonometric identity for cosine in terms of sine, $$Y = R \cos \theta = R [1 - \sin^2 \theta]^{1/2} \tag{7}$$

Replacing $\sin \theta$ by the equivalent expression $S$, where $S$ equals $Bt_2$, and expanding the exponential expression in a series, $$Y = R [1 - (Bt_2)^2]^{1/2} =$$
$$R [1 - \frac{1}{2}(Bt_2)^2 - \frac{1}{8}(Bt_2)^4 -$$
$$1/16 (Bt_2)^6 \ldots ] \tag{8}$$

If only the squared term of the series approximation for $\cos \theta$ is used, and a suitable adjustment of the coefficient of the squared term is made, the remaining terms can be discarded with very little error. It has been determined, for example, that if the coefficient is 0.58 instead of 0.50, there is no appreciable error in discarding the remaining terms. Consequently, the following expression for the $Y$ axis sweep is utilized, $$Y = Kt_1 [1 - c (Bt_2)^2] \tag{9}$$

where $c$ is the adjusted coefficient. Thus, the final equations for the $X$ and $Y$ sweeps are as follows:

$$X = RS$$
$$Y = R (1 - cS^2)$$

Referring now to FIG. 1, there is shown a block diagram of the circuit components utilized for generating sweep signals, and for introducing the modulating signal which reduces the effect of spoking. A range sawtooth generator 30, of conventional design, is triggered at the prf rate, producing a signal representing $R$, as illustrated. A scan sawtooth generator 40, triggered at the scan rate (for example, 26 scans per second) produces a sawtooth signal representing $S$, which is introduced into a first terminal of an operational amplifier 44. A conventional noise generator 42 produces a noise output designated as $N$, which is introduced into a second terminal of the operational amplifier 44, such that the output $S + N$, or $S_n$, is obtained. This output is connected to two separate inputs of a multiplier 34, which performs the function of squaring the $S_n$ signal, and in addition introduces the coefficient $c$. The output of multiplier 34 is coupled to a first input of an operational amplifier 35, the second input being connected to a DC source, so that the output of amplifier 35 is the term $1 - cS_n^2$. The output of amplifier 35 is connected to a first input terminal of multiplier 32, and the output of generator 30 is connected to a second input of multiplier 32 which produces at its output a signal representing $R (1 - cS_n^2)$. Similarly, the $S_n$ signal and the $R$ signal are both introduced into multiplier 33, producing the product $RS_n$.

The sweep signals thus developed are amplified through sweep amplifiers (not shown) and connected to the X and Y coils of CRT 46. Tube 46 is a long persistance CRT having a phosphor screen 47, or equivalent suitable light emitting surface which provides time integration of the display signals.

Figure 2:
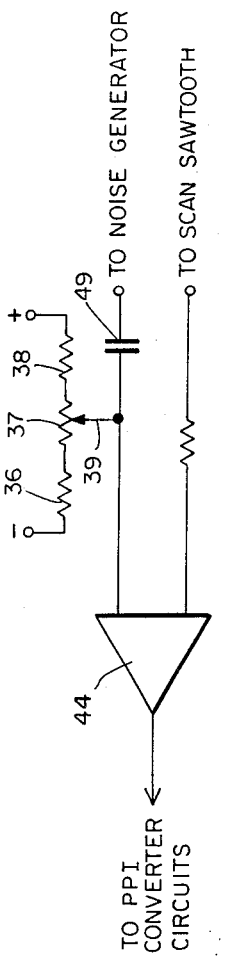
FIG. 2 is a circuit diagram of an alternate means of introducing the modulating signal.

As seen in FIG. 2, the noise modulation may be introduced as part of a zero offset circuit. The zero azimuth offset is obtained by introducing the azimuth scan signal into a first input terminal of operational amplifier 44, and introducing into the second terminal of such amplifier a reference voltage of adjustable magnitude and polarity so that, at time $t_2$ equal to zero, the display is centered at a zero azimuth reading. The reference signal is derived through the voltage divider comprised of resistors 36, 37 and 38 connected in series across a DC source. A variable position contact 39 is connected to resistor 37, so as to permit adjustment of the voltage connected to the operational amplifier. In this embodiment, the noise modulation signal is coupled through capacitor 49 to the wiper contact, so that the reference signal into the operational amplifier effectively causes the adjusted beam position to vary about the center position as a function of the noise signal.

In practice, the noise generator 42 may be any convenient source of noise, such as a noise diode, producing an output of approximately ½ volt and having a frequency bandwidth limited to the bandwidth of the sweep amplifiers. A noise source having a band extending from near zero to about 50 KHz is adequate. If wideband 'white' noise, with a bandwidth of about 5 times the radar video bandwidth, is used to produce the angle modulation, then the long integration time is no longer required. Each line of the display is widened so as to fill the gaps between the lines and eliminate the spoking. If wideband video noise is used for angle modulation, then it is necessary to employ an electrostatic deflection CRT or other wideband angle modulation technique. The multipliers used may be any conventional commercially available multipliers. It has been found that Motorola MCK 1594 IC module multipliers are very efficient for this use.

The preferred embodiment as described has been utilized with a PPI display system having the following characteristics:
 a. A sector of about 90° azimuth;
 b. 32 spokes, or angular positions;
 c. 26 azimuth scans per second; and
 d. prf of 832.

Figure 3:
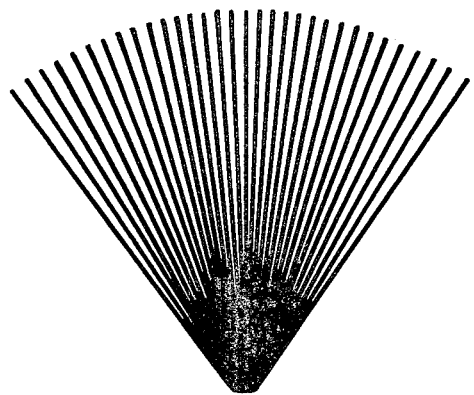
FIG. 3 is a sketch illustrating spoking on a CRT.
Figure 4:
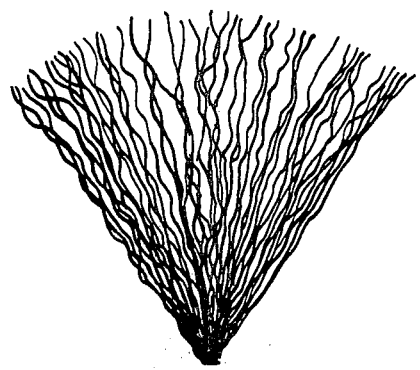
FIG. 4 is a sketch of a single frame display illustrating the random lateral deflection of spokes caused by the system of this invention.
Figure 5:
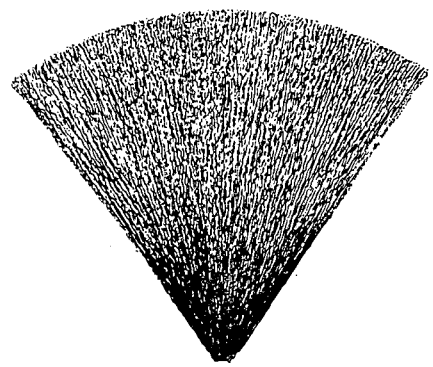
FIG. 5 is a sketch illustrating the display of this invention with a 4 second time integrated exposure.

FIG. 3 is an illustration of a 70° sector PPI display where no noise modulation is employed. It is seen that the 32 spokes are clearly discernible. FIG. 4 illustrates a single frame of the same system, during which the noise modulation was added. It is to be seen that, instead of single straight line spokes, the noise modulation causes each line to be scanned with random lateral deflections, the lateral deflections tending to fill up the space between the normally straight line spoke positions. FIG. 5 illustrates the same system as utilized in FIG. 4, but with a CRT having a long persistence material providing photographic integration. In practice, it has been found that such time integration can be obtained by a long persistence CRT such as a P7 double layer screen.

It can be shown mathematically, and has been confirmed experimentally, that small variations of the noise generator, or centering voltage, produce angular deflections which are nearly proportional to the modulating voltage. It is to be understood that additional corrections to the modulation voltage may be made if desired to achieve greater linearity between angular deflection and modulating voltage.

It is to be noted that, where a conventional as opposed to electronic scan antenna system is employed, the method and apparatus of this invention are changed only to the extent that the scanning signals need be changed. Thus, instead of scanning sin $\theta$ linearly as a function of time, the azimuth angle $\theta$ itself may be scanned linearly. It is to be understood that the practice of this invention is not limited in any way by the actual sweep signals generated, since the essence of the method of the invention is to add a modulating signal to the azimuth signal. The method of converting from polar sweep signals to orthogonal sweep signals may be accomplished differently from that shown herein in the preferred embodiment and still be within the spirit and scope of this invention.

It will be recognized by those skilled in the art that a wide variety of CRT screens are commercially available, and that the degree of time integration, and consequently the resulting reduction in spoking appearance, will vary depending upon the particular CRT employed. The characteristics of standard phosphors are designated by The Electronic Industries Association, from which the most desirable phosphor can be chosen for the particular application. As stated above, the P7 screen is a preferred screen for this application, and particularly for aircraft cockpit operation. In such application, it may be desirable to view the screen through a filter that absorbs practically all the blue and blue-green light which is emitted.

Figure 6:
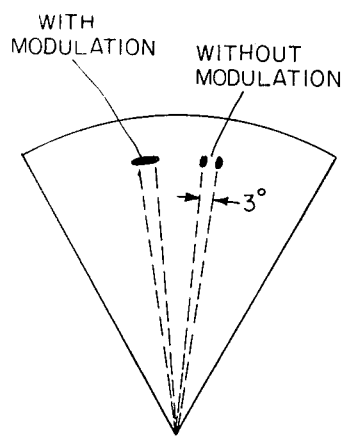
FIG. 6 is a sketch illustrating the improved target representation provided by this invention.

The apparatus and method of this invention provide a further improvement over the prior art, in addition to reducing spoking. As seen in FIG. 6, a point target may be within the radar beam at two adjacent beam positions (separated by 3°), and thus, on a conventional display, appear as two distinct points. However, where angular modulation is used, the target is presented as a single representation which is spread angularly, which single representation is easier to perceive and interpret.

I claim:

1. A method of reducing spoking on a PPI display comprising continuously and randomly laterally deflecting each scan line and time integrating said PPI display.

2. Apparatus for reducing spoking caused by discrete scanning lines on a PPI display, comprising:
 a. means for continuously laterally deflecting each said scanning line in a random manner throughout the gaps between the lines; and
 b. means for time integrating said modulated scanning lines, said integration producing a display in which the appearance of spokes is substantially reduced.

3. In a PPI display sstem having a display representing slant range and azimuth angle corresponding to a discrete number of beam positions, apparatus comprising:
 a. scanning signal generator means for generating scanning signals;
 b. a modulation circuit for continuously and randomly modulating said scanning signals; and
 c. high persistence display means, driven by said modulated scanning signals, said modulated scanning signal causing lateral deflection of the discrete representations on said display means such that each line of the display is widened so as to fill the gaps between the lines, and the high persistence feature of said display means providing time integration of said lateral deflections, so as to reduce the effect of spoking on the display.

4. In a PPI display system having a display representing slant range and azimuth angle corresponding to a discrete number of beam positions, apparatus comprising:
  a. scanning signal generator means for generating scanning signals, said scanning signal generator means comprising a scan sawtooth generator, a noise generator, and an adding circuit for combining the outputs of said scan sawtooth generator and said noise generator to produce modulated scanning signals;
  b. a range sawtooth generator for providing range signals;
  c. converting means for converting said range signals and said modulated scanning signals to provide orthogonal drive signals; and
  d. high persistence display means, driven by said orthogonal drive signals, said high persistence display means providing time integration of the display, so as to reduce the effect of spoking on the display.

5. The apparatus as described in claim 4 wherein said display means is a long persistence CRT.

6. The apparatus as described in claim 5 comprising a scan generator centering control circuit, and wherein the output of said noise generator is coupled to the output of said centering control.

7. A method of reducing spoking on a PPI display comprising:
  a. generating an azimuth scan signal;
  b. generating a continuous random modulating signal, and adding said modulating signal to said azimuth scan signal;
  c. generating a range signal;
  d. converting said modulated azimuth scan signal and said range signal into orthogonal signals; and
  e. driving a long persistance display tube with said converted signals so that each scan line is laterally deflected over the angular range between adjacent lines.

8. The method as described in claim 7, wherein said modulating signal is generated by a noise generator.

9. A method of reducing spoking on a PPI display for a radar system, comprising continuously and randomly laterally deflecting each scan line as it is scanned so as to fill the gaps between the scan lines.

10. The method as described in claim 9, wherein each scan line is laterally deflected at a frequency greater than the radar bandwidth.

11. Apparatus for reducing spoking on a PPI display for a radar system, comprising means for laterally deflecting each scanning line on said display in a manner such that each such line is sperad out angularly to fill the gaps between the lines, said laterally deflecting means providing that each scan line is continuously and randomly laterally deflected as it is scanned.

12. The apparatus as described in claim 11, wherein said deflecting means deflects said lines at a frequency greater than the radar bandwidth.

13. The apparatus as described in claim 12, wherein said deflecting means comprises a wideband noise generator.

* * * * *

UNITED STATES PATENT OFFICE
CERTIFICATE OF CORRECTION

Patent No. 3,810,173          Dated May 7, 1974

Inventor(s) George M. Kirkpatrick

It is certified that error appears in the above-identified patent and that said Letters Patent are hereby corrected as shown below:

Column 1, line 52, after "antenna", insert --beam--.

Signed and sealed this 29th day of October 1974.

(SEAL)
Attest:

McCOY M. GIBSON JR.
Attesting Officer

C. MARSHALL DANN
Commissioner of Patents